United States Patent
Kesavan

(10) Patent No.: US 7,179,850 B2
(45) Date of Patent: Feb. 20, 2007

(54) FRICTION MATERIALS CONTAINING TIN OXIDES

(75) Inventor: Sunil K. Kesavan, Troy, MI (US)

(73) Assignee: Honeywell International, Inc., Morristown, NJ (US)

( * ) Notice: Subject to any disclaimer, the term of this patent is extended or adjusted under 35 U.S.C. 154(b) by 32 days.

(21) Appl. No.: 09/962,067

(22) Filed: Sep. 25, 2001

(65) Prior Publication Data

US 2003/0059645 A1    Mar. 27, 2003

(51) Int. Cl.
*C08J 5/14* (2006.01)
*C08K 3/22* (2006.01)

(52) U.S. Cl. ........................ 523/155; 523/152; 524/430

(58) Field of Classification Search ................. 523/149, 523/150, 152, 153, 155; 524/399, 430; 260/998.13
See application file for complete search history.

(56) References Cited

U.S. PATENT DOCUMENTS

| 3,297,599 A | * | 1/1967 | Eschen ........................ 260/3 |
| 4,189,424 A | * | 2/1980 | Takamatsu ............... 260/42.15 |
| 5,145,619 A | | 9/1992 | Abramovici |
| 5,889,081 A | | 3/1999 | Kakegawa et al. |
| 5,964,334 A | | 10/1999 | Shimoda et al. |
| 5,971,113 A | * | 10/1999 | Kesavan et al. ............ 188/251 |

FOREIGN PATENT DOCUMENTS

| EP | 538772 | 10/1992 |
| EP | 0538772 | 4/1993 |
| WO | WO 01/33099 | 5/2001 |

* cited by examiner

*Primary Examiner*—Tae H Yoon

(57) ABSTRACT

A friction material matrix is described, containing a tin oxide, such as but not limited to stannous oxide or stannic oxide, and a binder system, the binder system physically or chemically binding the tin oxide. The tin oxide is preferably present in an amount in the range of about 0.3 to about 20 weight percent, based on the total weight of the friction material matrix. The tin oxide preferably has a Mohs hardness level of about 6.5. The tin oxide improves the performance behavior of a friction couple at an interface between the friction material matrix and an automotive braking element.

2 Claims, No Drawings

FRICTION MATERIALS CONTAINING TIN OXIDES

FIELD OF THE INVENTION

The present invention relates generally to friction materials, and more particularly to friction materials containing tin oxides.

BACKGROUND OF THE INVENTION

Friction materials serve in a variety of ways to control the deceleration of a variety of vehicles and machines such as, but not limited to automobiles. In an automotive vehicle, one of the purposes of the friction members is to physically stop the vehicle. These units, including disk brake pads and rotors and brake shoes and drums, convert physical movement into frictional heat. Every wheel contains either a disk or brake drum assembly.

Friction members for brakes are typically made from materials that will produce friction with the rotor or drum and withstand the high temperatures developed during braking. One of the most common type of friction materials used in brakes and clutches for normal duty is generally termed organic. These organic friction materials usually contain about 30–40 weight % of organic components. One of the main constituents of practically all organic friction materials at one time was asbestos fiber, although small quantities of other fibrous reinforcement may have been used. Since asbestos alone did not offer all of the desired properties, other materials called property modifiers, either abrasive or nonabrasive, were added to provide desired amounts of friction, wear, fade, recovery, noise, and rotor compatibility. A resin binder, such as phenolic or cresylic resin, held the other materials together in a matrix. This binder was not completely inert and made contributions to the frictional characteristics of the composite. Because asbestos has been alleged to be the cause of certain health problems and is no longer environmentally acceptable, most modern brake pads and drum linings are made without asbestos. Thus, most current friction linings are made from synthetic and steel fibers, and iron, ceramic, and metallic powders.

Conventional friction materials operate under a whole range of operating temperatures and pressures. However, the wear mechanisms governing the wear life of friction materials under low-duty conditions are significantly different from the factors governing heavy-duty conditions. During use, the physicochemical changes at the interface between the friction material and cast iron drums, for example, govern the performance behavior of the friction couple. The choice of the proper abrasive has a great bearing on the formation and destruction of the dynamic friction (i.e., transfer) film. Unfortunately, conventional friction material compositions are somewhat unsatisfactory with respect to the performance behavior of the friction couple, especially during low-duty conditions. This can lead to sub-par performance of the braking system, as well as objectionable noises when braking, both of which lead to consumer dissatisfaction.

Therefore, there exists a need for a friction material composition having improved abrasive characteristics to enhance the performance behavior of the friction couple, especially during low-duty conditions.

SUMMARY OF THE INVENTION

In accordance with a first embodiment of the present invention, a friction material matrix is provided, comprising: (1) at least one tin oxide-containing material; and (2) at least one binder system, the binder system physically or chemically binding the at least one tin oxide-containing material; wherein the at least one tin oxide-containing material is present in an amount in the range of about 0.3 to about 20 weight percent, based on the total weight of the friction material matrix.

In accordance with a second embodiment of the present invention, a friction material matrix is provided, comprising: (1) at least one tin oxide-containing material; and (2) at least one binder system, the binder system physically or chemically binding the at least one tin oxide-containing material; wherein the at least one tin oxide-containing material is present in an amount in the range of about 0.3 to about 20 weight percent, based on the total weight of the friction material matrix; wherein the at least one tin oxide-containing material has a Mohs hardness level of about 6.5.

In accordance with a third embodiment of the present invention, an automotive braking element is provided, comprising: (1) at least one tin oxide-containing material; and (2) at least one binder system, the binder system physically or chemically binding the at least one tin oxide-containing material so as to form a friction material matrix; wherein the at least one tin oxide-containing material is present in an amount in the range of about 0.3 to about 20 weight percent, based on the total weight of the friction material matrix; wherein the at least one tin oxide-containing material improves the performance behavior of a friction couple at an interface between the friction material matrix and the automotive braking element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiment(s) is merely exemplary in nature and is in no way intended to limit the invention, its application, or uses.

Friction materials useful in the practice of the invention may optionally contain one or more thermosetting resinous binders present in conventional amounts; reinforcing fibers present in conventional amounts; metal powders present in conventional amounts; lubricants, preferably solid, present in conventional amounts; abrasives present in conventional amounts; organic fillers present in conventional amounts; and inorganic fillers present in conventional amounts. Other materials may be added as well, as is known in the art.

As that term is used herein, "friction material matrix" means at least one tin oxide-containing material useful in the practice of the present invention, at least one binder system (e.g., phenolic resin), and optionally, additives such as, but not limited to, reinforcing fibers, metal powders, lubricants, abrasives, organic fillers, organic fillers, and the like.

The present invention proposes the use of tin oxides, such as but not limited to stannous oxide (SnO) and/or stannic oxide ($SnO_2$), as abrasives in friction materials, such as those used for drum linings, in order to control wear mechanisms, especially under the conditions of low duty wear. Without being bound to a particular theory of the operation of the present invention, it is believed that the tin oxides of the present invention aid in stabilizing friction and reducing noise generation characteristics of friction materials.

Either powdered, natural, or synthetic stannous oxides/stannic oxides can be used to practice the present invention. Additionally, the tin oxides of the present invention preferably have a Mohs hardness level of about 6.5.

By way of a non-limiting example, the tin oxides of the present invention are preferably incorporated into either a wet or dry mix that can be formed into a drum lining by any number of conventional methods. Preferred amounts of the tin oxides range from about 0.3 weight percent up to about 20 weight percent, based on the total weight of the friction material matrix. Both stannous oxide and stannic oxide are readily commercially available from Post Apple Scientific, Inc. (North East, Pa.).

By way of a non-limiting example of an illustrative friction material matrix composition, in accordance with the general teachings of the present invention, reference is made to the Example, below:

EXAMPLE

| INGREDIENT | VOLUME PERCENT (based on the total volume of the friction material matrix) |
|---|---|
| Nitrile rubber | 17 |
| Calcium sulfate | 16 |
| Vermiculite | 7 |
| Phenolic resin | 19 |
| Steel fiber | 5 |
| Graphite | 8 |
| Calcium hydroxide | 4 |
| Tin oxide abrasive | 6 |
| Friction dust | 16 |
| Curatives | 2 |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A friction material matrix, comprising:
   at least one tin oxide-containing material having a Mohs hardness level of about 6.5; and
   at least one binder system, the binder system physically or chemically binding the at least one tin oxide-containing material;
   wherein the friction material matrix is made without asbestos and the at least one tin oxide-containing material is present in an amount in the range of about 0.3 to about 20 weight percent, based on total weight of the friction material matrix, wherein the friction material matrix is incorporated into a drum lining of an automotive braking system.

2. The friction material matrix in accordance with claim 1, wherein the at least one tin oxide-containing material is selected from the group consisting of stannous oxide, stannic oxide, and combinations thereof.

* * * * *